(12) United States Patent
Copey et al.

(10) Patent No.: US 11,352,484 B2
(45) Date of Patent: Jun. 7, 2022

(54) RUBBER COMPOSITIONS COMPRISING A SPECIFIC COMBINATION OF A COUPLING AGENT AND A HYDROCARBON RESIN

(71) Applicant: COMPAGNIE GENERALE DES ETABLISSEMENTS MICHELIN, Clermont-Ferrand (FR)

(72) Inventors: Laurent Copey, Clermont-Ferrand (FR); Karine Longchambon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 60 days.

(21) Appl. No.: 16/753,205

(22) PCT Filed: Oct. 3, 2018

(86) PCT No.: PCT/FR2018/052433
§ 371 (c)(1),
(2) Date: Apr. 2, 2020

(87) PCT Pub. No.: WO2019/069017
PCT Pub. Date: Apr. 11, 2019

(65) Prior Publication Data
US 2020/0332092 A1    Oct. 22, 2020

(30) Foreign Application Priority Data

Oct. 4, 2017 (FR) ........................................ 1759293

(51) Int. Cl.
*C08L 15/00* (2006.01)
*C07F 7/08* (2006.01)
*B60C 1/00* (2006.01)

(52) U.S. Cl.
CPC ............ *C08L 15/00* (2013.01); *B60C 1/0016* (2013.01); *C07F 7/081* (2013.01)

(58) Field of Classification Search
CPC ................ C08L 15/00; C07F 7/08; B60C 1/00
USPC ........................................................ 524/525
See application file for complete search history.

(56) References Cited

U.S. PATENT DOCUMENTS

| 5,227,425 A | 7/1993 | Rauline |
| 5,852,099 A | 12/1998 | Vanel |
| 5,900,449 A | 5/1999 | Custodero et al. |
| 5,977,238 A | 11/1999 | Labauze |
| 6,013,718 A | 1/2000 | Cabioch et al. |
| 6,420,488 B1 | 7/2002 | Penot |
| 6,503,973 B2 | 1/2003 | Robert et al. |
| 6,536,492 B2 | 3/2003 | Vasseur |
| 6,815,473 B2 | 11/2004 | Robert et al. |
| 7,122,590 B2 | 10/2006 | Cruse et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,491,767 B2 | 2/2009 | Durel et al. |
| 7,820,771 B2 | 10/2010 | Lapra et al. |
| 8,344,063 B2 | 1/2013 | Marechal et al. |
| 8,455,584 B2 | 6/2013 | Robert et al. |
| 8,461,269 B2 | 6/2013 | Varagniat et al. |
| 8,492,479 B2 | 7/2013 | Robert et al. |
| 8,623,937 B2 | 1/2014 | Belin et al. |
| 8,883,929 B2 | 11/2014 | Gandon-Pain et al. |
| 9,000,092 B2 | 4/2015 | Belin et al. |
| 10,676,542 B2 | 6/2020 | Dire et al. |
| 2001/0034389 A1 | 10/2001 | Vasseur |
| 2001/0036991 A1 | 11/2001 | Robert et al. |
| 2002/0115767 A1 | 8/2002 | Cruse et al. |
| 2002/0183436 A1 | 12/2002 | Robert et al. |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2006/0093773 A1 | 5/2006 | Dujardin et al. |
| 2008/0132644 A1 | 6/2008 | Lapra et al. |
| 2009/0270558 A1 | 10/2009 | Gandon-pain et al. |
| 2010/0022714 A1 | 1/2010 | Varagniat et al. |
| 2010/0184912 A1 | 7/2010 | Marechal et al. |

(Continued)

FOREIGN PATENT DOCUMENTS

| CN | 104024317 A | 9/2014 |
| CN | 102869522 B | 9/2015 |

(Continued)

OTHER PUBLICATIONS

International Search Report dated Nov. 30, 2018, in corresponding PCT/FR2018/052433 (4 pages).

(Continued)

*Primary Examiner* — Deve V Hall
(74) *Attorney, Agent, or Firm* — Venable LLP

(57) ABSTRACT

A rubber composition is based on at least: a diene elastomer; a reinforcing inorganic filler; an agent for coupling the reinforcing inorganic filler with the diene elastomer, said coupling agent being an organofunctional silane comprising at least one oligomer of general formula (I), as described in the claims, bearing at least one blocked mercaptosilane unit and at least one mercaptosilane unit, a hydrocarbon-based resin predominantly composed of monomers chosen from the group consisting of cyclopentadiene, dicyclopentadiene, methylcyclopentadiene and mixtures thereof, and a cross-linking system. A semi-finished article and a tire may comprise at least one such rubber composition.

20 Claims, No Drawings

(56) References Cited

U.S. PATENT DOCUMENTS

| | | |
|---|---|---|
| 2010/0249270 A1 | 9/2010 | Robert et al. |
| 2010/0252156 A1 | 10/2010 | Robert et al. |
| 2011/0021702 A1 | 1/2011 | Gandon-Pain et al. |
| 2011/0294915 A1 | 12/2011 | Belin et al. |
| 2011/0306700 A1 | 12/2011 | Belin et al. |
| 2012/0208948 A1 | 8/2012 | Gandon-Pain et al. |
| 2013/0203890 A1 | 8/2013 | Lopitaux et al. |
| 2015/0005448 A1 | 1/2015 | Longchambon et al. |
| 2017/0267027 A1 | 9/2017 | Kunisawa |
| 2018/0340055 A1 | 11/2018 | De Gaudemaris et al. |
| 2019/0077887 A1 | 3/2019 | Dire et al. |
| 2020/0325312 A1 | 10/2020 | Labrunie et al. |

FOREIGN PATENT DOCUMENTS

| | | |
|---|---|---|
| EP | 0501227 A1 | 9/1992 |
| EP | 0735088 A1 | 10/1996 |
| EP | 0778311 A1 | 6/1997 |
| EP | 0810258 A1 | 12/1997 |
| EP | 1127909 A1 | 8/2001 |
| EP | 2338698 A1 | 6/2011 |
| FR | 2740778 A1 | 5/1997 |
| FR | 2765882 A1 | 1/1999 |
| JP | 2014-47295 A | 3/2014 |
| JP | 2015-174991 A | 10/2015 |
| WO | 97/36724 A2 | 10/1997 |
| WO | 99/09036 A1 | 2/1999 |
| WO | 99/16600 A1 | 4/1999 |
| WO | 00/05300 A1 | 2/2000 |
| WO | 00/05301 A1 | 2/2000 |
| WO | 01/92402 A1 | 12/2001 |
| WO | 02/48256 A2 | 6/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2003/087693 A1 | 10/2003 |
| WO | 2004/09686 A1 | 1/2004 |
| WO | 2006/069792 A1 | 7/2006 |
| WO | 2006/069793 A1 | 7/2006 |
| WO | 2007/098120 A1 | 8/2007 |
| WO | 2008/003434 A1 | 1/2008 |
| WO | 2008/003435 A1 | 1/2008 |
| WO | 2008/141702 A1 | 11/2008 |
| WO | 2009/000750 A1 | 12/2008 |
| WO | 2009/000752 A1 | 12/2008 |
| WO | 2010/072682 A1 | 7/2010 |
| WO | 2010/072683 A1 | 7/2010 |
| WO | WO-2014021002 A1 * | 2/2014 ............ C08C 19/22 |
| WO | 2016/098505 A1 | 6/2016 |
| WO | 2017/060395 A1 | 4/2017 |
| WO | 2017/060634 A1 | 4/2017 |
| WO | 2017/064235 A1 | 4/2017 |

OTHER PUBLICATIONS

S. Brunauer, et al., "Adsorption of Gases in Multimolecular Layers", J. Am. Chem. Soc., vol. 60, pp. 309-319 (1938).

F. Vilmin, et al., Fast and Robust Method for the Determination of Microstructure and Composition in Butadiene, Styrene-Butadiene, and Isoprene Rubber by Near-Infrared Spectroscopy, Applied Spectroscopy, vol. 60, No. 6, pp. 319-630 (2006).

R. Mildenberg, et al., Hydrocarbon Resins, VCH, New York, chapter 5.5, pp. 141-146 (1997).

\* cited by examiner

RUBBER COMPOSITIONS COMPRISING A SPECIFIC COMBINATION OF A COUPLING AGENT AND A HYDROCARBON RESIN

BACKGROUND

The invention relates to rubber compositions comprising at least one inorganic reinforcing filler and a specific combination of a hydrocarbon-based resin and of an agent for coupling the inorganic filler with the elastomer; these compositions notably being intended for tyres and more particularly for tyre treads.

Since fuel savings and the need to protect the environment have become a priority, it has proven necessary to produce tyres having a reduced rolling resistance, without adversely affecting the other properties of the tyre, in particular without reducing the wet grip.

However, it is well known to those skilled in the art that an improvement in one performance quality for tyres is often obtained at the expense of its other performance qualities.

For example, one way of giving a tyre high wet grip is to use, for the tread, a rubber composition which has a good hysteretic potential. However, at the same time, this tread must have the lowest possible contribution to the rolling resistance to limit the rolling-related energy losses; i.e. it must have the least possible hysteresis.

Improving the rolling resistance has been made possible by virtue of the use of novel rubber compositions reinforced with inorganic fillers, in particular specific silicas of the highly dispersible type, which are capable of rivalling, from the reinforcing perspective, a conventional tyre-grade carbon black, while offering these compositions a lower hysteresis, which is synonymous with a lower rolling resistance. These specific silicas of the highly dispersible type typically have a BET specific surface area that is within a range extending from 100 to 250 m$^2$/g.

In order to facilitate the dispersion of the reinforcing inorganic fillers, it is known practice to use coupling agents, also known as bonding agents, which have the role of providing connections or bonds between the surface of the inorganic filler particles and the elastomer of the rubber compositions, while at the same time facilitating the dispersion of this inorganic filler within the elastomeric matrix.

It is recalled here that the term "coupling agent" (inorganic filler/elastomer) should be understood as meaning, in a known manner, an agent that is capable of establishing a satisfactory bond, of chemical and/or physical nature, between the inorganic filler and the diene elastomer; such an at least difunctional coupling agent has, for example, the simplified general formula "Y—W—X", in which: Y represents a functional group ("Y" function) that is capable of bonding physically and/or chemically to the inorganic filler, such a bond being able to be established, for example, between a silicon atom of the coupling agent and the surface hydroxyl (OH) groups of the inorganic filler (for example the surface silanols when it is silica); X represents a functional group ("X" function) that is capable of bonding physically and/or chemically to the diene elastomer, for example via a sulfur atom; W represents a divalent group for connecting Y and X. The coupling agents should in particular not be confused with simple inorganic filler covering agents which, in a known manner, may include the Y function which is active towards the reinforcing inorganic filler but which do not contain the X function which is active towards the diene elastomer.

Among the many existing filler/elastomer coupling agents, mercaptosilanes prove to be particularly advantageous. However, given their very high reactivity, blocked mercaptosilanes are generally used. It is recalled here that blocked mercaptosilanes, in a manner well known to those skilled in the art, are silane precursors that are capable of forming mercaptosilanes during the preparation of rubber compositions (see, for example, US 2002/0115767 A1 or international patent application WO 02/48256). These molecules have a blocking group instead of the hydrogen atom of the corresponding mercaptosilane. The blocked mercaptosilanes are capable of being deblocked by replacing the blocking group with a hydrogen atom, during the compounding and curing, to lead to the formation of a more reactive mercaptosilane, defined as a silane whose molecular structure contains at least one thiol (—SH) (mercapto-) group bonded to a carbon atom and at least one silicon atom. These blocked mercaptosilane coupling agents are thus generally used in the presence of a blocked mercaptosilane activator, the role of which is to initiate, accelerate or amplify the activity of the blocked mercaptosilane, as is notably specified in U.S. Pat. No. 7,122,590. Such an activator or "deblocking agent" for tyre rubber compositions is generally composed of a guanidine, in particular N,N'-diphenylguanidine (DPG).

Although it has been shown that the use of blocked mercaptosilane coupling agents has the advantage of improving the rolling resistance when they are used in rubber compositions, they have the drawback of deteriorating the wet grip.

It is known that the wet grip performance of rubber compositions can be improved by adding plasticizing hydrocarbon-based resins.

For example, EP 2338698 A1 describes a rubber composition comprising an elastomer, silica and a combination of a coupling agent comprising both mercaptosilane groups and blocked mercaptosilane groups and of a resin of α-methylstyrene and styrene. It is found that some of the illustrated rubber compositions have degraded rolling resistance.

Thus, there is still a need to improve the rolling resistance performance for rubber compositions, notably those intended for tyres, without penalizing the wet grip performance.

The aim of the present invention is to meet this need.

SUMMARY

The Applicant has discovered, surprisingly, that a specific combination of a coupling agent and of a hydrocarbon-based resin in a reinforced rubber composition meets this need. Specifically, rubber compositions comprising this specific combination have improved rolling resistance when compared with the compositions of the prior art, without the wet grip being penalized. The compositions of the invention also have the advantage of having improved grip performance on snow-covered ground.

Consequently, a first subject of the present invention relates to a rubber composition based on at least:
a diene elastomer;
a reinforcing inorganic filler;
an agent for coupling the reinforcing inorganic filler with the diene elastomer, said coupling agent being an organofunctional silane comprising at least one oligomer bearing at least one blocked mercaptosilane unit and at least one mercaptosilane unit, the oligomer corresponding to general formula (I) below:

$$(A)_p(B)_q \quad \quad (I)$$

in which
- A is a symbol representing a blocked mercaptosilane unit corresponding to general formula (II):

$$R_3-\underset{\underset{O}{\|}}{C}-S-R_4-\underset{\underset{X_u}{|}}{\overset{\overset{Z^c_w}{|}}{Si}}-Z^b_v \quad (II)$$

- B is a symbol representing a mercaptosilane unit corresponding to general formula (III)

$$HS-R_4-\underset{\underset{X_u}{|}}{\overset{\overset{Z^c_w}{|}}{Si}}-Z^b_v \quad (III)$$

in which formulae (II) and (III):
- $R_3$ represents a group chosen from a hydrogen atom, a linear or branched C1-C18 alkyl and a linear or branched C2-C18 alkenyl,
- each $R_4$, which may be identical or different, represents a saturated, linear or branched C1-C6 divalent hydrocarbon-based group,
- each $Z^b$ forms a bridging structure between a silicon atom of one unit and a silicon atom of another unit, these units possibly being identical or different, and is chosen from the group consisting of $(-O-)_{0.5}$ and $[-O(R^0CR^0)_fO-]_{0.5}$ with $R^0$, which may be identical or different, representing a group chosen from a hydrogen atom, methyl, ethyl and propyl and f representing a number within a range extending from 2 to 15,
- each $Z^c$, which may be identical or different, forms a cyclic structure with the silicon atom of one unit and is $[-O(R^0CR^0)_fO-]_{0.5}$ with $R^0$ and f as defined previously,
- each X, which may be identical or different, is chosen from the group consisting of a hydrogen atom, a hydroxyl group, a C1-C6 alkyl group, a C1-C6 alkoxy group and a group) $HO(R^0CR^0)_f$ O— with $R^0$ and f as defined previously,
- with u+v+2w=3 in which u is a number equal to 0, 1, 2 or 3, v is a number equal to 1, 2 or 3 and w is a number equal to 0 or 1,
- p is a number within a range extending from 1 to 20,
- q is a number within a range extending from 1 to 20, and a hydrocarbon-based resin predominantly composed of monomers chosen from the group consisting of cyclopentadiene, dicyclopentadiene, methylcyclopentadiene and mixtures thereof, and a crosslinking system.

A second subject of the present invention relates to a semi-finished article for a tyre, comprising at least one composition as defined above. More preferentially, this semi-finished article for a tyre is a tread.

A third subject of the present invention relates to a tyre comprising at least one composition as defined above.

1—MEASURING METHODS USED 1.1—Measurement of the Glass Transition Temperature Tg

All the glass transition temperature Tg values are measured in a known manner by DSC (Differential Scanning calorimetry) according to the standard ASTM D3418 (1999).

1.2—Measurement of the Softening Point of the Resins

The softening point of a resin is measured according to the standard ISO 4625 (ring and ball method).

1.3—Measurement of the Mn, Mw and PI of the Hydrocarbon-Based Resins

The macrostructure (Mw, Mn, PI and Mz) of the hydrocarbon-based resin is determined by size exclusion chromatography (SEC) on the basis of the standards ISO 16014 (Determination of average molecular mass and molecular mass distribution of polymers using size exclusion chromatography), ASTM D5296 (Molecular Weight Averages and molecular weight distribution of polystyrene by High performance size exclusion chromatography) and DIN 55672 (size exclusion chromatography).

For these measurements, the resin sample is dissolved in antioxidant-free tetrahydrofuran up to a concentration of 1.5 g/l. The solution is filtered with a Teflon filter with a porosity of 0.45 μm, using for example a disposable syringe fitted with a filter. A volume of 100 μl is injected through a set of size exclusion chromatography columns. The mobile phase is eluted with a flow rate of 1 ml/min. The columns are thermostatically maintained at 35° C. in an oven. Detection is performed by a refractometer thermostatically maintained at 35° C. The stationary phase of the columns is based on a polystyrene/divinylbenzene gel having a controlled porosity. The polymer chains are separated according to the volume that they occupy when they are dissolved in the solvent: the larger the volume they occupy, the less the pores of the columns are accessible to them and the shorter their elution time.

A Moore calibration curve connecting the logarithm of the molar mass (log M) to the elution time (et) is produced beforehand with polystyrene standards and modelled by a third degree polynomial: log(molar mass of polystyrene)= a+b et+c et2+d et3.

For the calibration curve, polystyrene standards with narrow molecular distributions are used (polydispersity index, PI, of less than or equal to 1.1). The range of molar masses of these standards extends from 160 to about 70 000 g/mol. These standards may be grouped together in "families" of 4 or 5 standards having a log M increment of about 0.55 between each family.

Use may be made of certified (ISO 13885 and DIN 55672) standard kits, for instance the kits of vials from the company PSS (Polymer Standards Service, reference PSS-pskitrll-3), and also an additional PS standard with Mp=162 g/mol (Interchim, reference 178952). These kits are provided in the form of three vials each containing a family of polystyrene standards in suitable amounts:
Black vial: Mp=1220, 4850, 15 500 and 67 500 g/mol,
Blue vial: Mp=376, 3470, 10 400, 46 000 g/mol,
Yellow vial: Mp=266, 1920, 7200, 28 000 g/mol,
PS162: Mp=162 g/mol.

The number-average molar mass (Mn), the weight-average molar mass (Mw), the average mass (Mz) and the polydispersity (PI) of the resin analysed are calculated from this calibration curve. This is why they are referred to as molar masses relative to a polystyrene calibration.

For the calculation of the average masses and of the polydispersity index, the limits of integration of the elution of the product are defined on the chromatogram corresponding to the injection of the sample. The refractometric signal defined between the two limits of integration is "cut" every second. For each of the "elementary cuts", the elution time ti and the area of the signal from the detector Ai are read off.

It is recalled here that: PI=Mw/Mn, with Mw the weight-average molecular mass and Mn the number-average molecular mass. It is also recalled that the masses Mw, Mn and Mz are average masses calculated according to the following formulae:

$$Mz = \frac{\Sigma\, Ai \times Mi^2}{\Sigma\, Ai \times Mi}$$

$$Mn = \frac{\Sigma\, Ai}{\Sigma\, \frac{Ai}{Mi}}$$

$$Mw = \frac{\Sigma\, Ai \times Mi}{\Sigma\, Ai}$$

in which Ai is the amplitude of the signal from the refractometric detector corresponding to the mass Mi and to the elution time ti.

The equipment used for the SEC measurement is a liquid chromatography system, for example the Waters Alliance 2690 system comprising a pump, a degasser and an injector; a differential refractometer (for example the Waters 2410 refractometer), software for data acquisition and processing, for example the Waters Empower software, a column oven, for example the Waters "Column Heater Module", and four columns mounted in series in the following order:

| Number | Brand | Molar mass range (g/mol) | Length (mm) | Inside diameter (nm) | Particle size (μm) | Trade name | Reference, for information purposes |
|---|---|---|---|---|---|---|---|
| Columns 1 and 2 | Polymer Laboratories | 200-400000 | 300 | 7.5 | 5 | MIXED-D | PL1110-6504 |
| Columns 3 and 4 | Polymer Laboratories | 200-30000 | 300 | 7.5 | 3 | MIXLD-E | PL1110-6300 |

1.4—Measurement of the Proton Content in a Resin

The aromatic proton content and the ethylenic proton content are measured by $^1$H NMR. This determination is performed with respect to all of the signals detected. Thus, the results obtained are expressed as percentage of the peak area.

The samples are dissolved in deuterated chloroform ($CDCl_3$) in a proportion of about 10 mg of resin in about 1 mL of solvent. The spectra are acquired on a Brüker Avance 500 MHz spectrometer equipped with a Brüker "broad band" BBO z-grad 5 mm probe. The $^1$H NMR experiment uses a single 30° pulse sequence and a repetition delay of 5 seconds between each acquisition. 64 accumulations are performed at room temperature. The chemical shifts are calibrated relative to the protonated impurity of the deuterated chloroform; δ ppm $^1$H at 7.20 ppm. The $^1$H NMR signals of the aromatic protons are located between 8.5 ppm and 6.2 ppm. The ethylenic protons, for their part, give rise to signals between 6.2 ppm and 4.5 ppm. Finally, the signals corresponding to the aliphatic protons are located between 4.5 ppm and 0 ppm. The areas of each category of protons are taken relative to the sum of these areas to thus give an area distribution percentage for each category of protons.

1.5—Measurement of the BET Specific Surface Area and of the CTAB Specific Surface Area The BET specific surface area is determined by gas adsorption using the Brunauer-Emmett-Teller method described in "The Journal of the American Chemical Society", (Vol. 60, page 309, February 1938), and more specifically according to a method derived from the standard NF ISO 5794-1, appendix E, of June 2010 [multipoint (5 point) volumetric method—gas: nitrogen—degassing under vacuum: one hour at 160° C.—relative pressure range p/po: 0.05 to 0.2].

The CTAB specific surface area values were determined according to the standard NF ISO 5794-1, appendix G of June 2010. The process is based on the adsorption of CTAB (N-hexadecyl-N,N,N-trimethylammonium bromide) onto the "outer" surface of the reinforcing filler.

1.6—Determination of the Microstructure of the Elastomers by Near-Infrared (NIR) Spectroscopy Near-infrared (NIR) spectroscopy is used to quantitatively determine the mass content of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] performed using standard elastomers having a composition determined by $^{13}$C NMR. The styrene content and the microstructure are then calculated from the NIR spectrum of an elastomer film about 730 μm thick. The spectrum is acquired in transmission mode between 4000 and 6200 $cm^{-1}$ with a resolution of 2 $cm^{-1}$ using a Brüker Tensor 37 Fourier-transform near-infrared spectrometer equipped with an InGaAs detector cooled by the Peltier effect.

1.7—Dynamic Properties of the Rubber Compositions (after Curing)

The dynamic properties are measured on a viscosity analyser (Metravib VA4000) according to the standard ASTM D 5992-96. The response of a sample of crosslinked composition (cylindrical specimen 4 mm thick and with a cross section of 400 $mm^2$), subjected to a simple alternating sinusoidal shear stress, at a frequency of 10 Hz, during a temperature sweep, at a set stress of 0.7 MPa, is recorded, and the values of G* and tan δ observed at −20° C. (i.e. $G^*_{-20°\,C.}$ and $tan(\delta)_{-2°\,C.}$) are recorded.

The same sample is also subjected, at a temperature of 23° C., to a strain amplitude sweep from 0.1% to 50% (forward cycle) and then from 50% to 0.1% (return cycle). For the return cycle, the maximum value of the loss factor, denoted tan(δ)max, is recorded.

The $tan(\delta)_{max}$ results at 23° C. are indicated in base 100 and are obtained in the following manner: the $tan(\delta)_{max}$ result at 23° C. obtained for a test sample is calculated in base 100, the arbitrary value 100 being assigned to the control:

$tan(\delta)_{max}$ result at 23° C. (base 100)=(tan(δ)max value at 23° C. of the test sample×100)/(tan(δ) max value at 23° C. of the control).

In this way, a result less than 100 indicates a decrease in the hysteresis (which is favourable to the rolling resistance).

It is recalled that, as is known to those skilled in the art, the tan(δ) value observed at −20° C. is representative of the wet grip potential; the greater the tan(δ)$_{-20°\,C.}$ value, the better the grip. The result is expressed in base 100 by means of the following calculation: An arbitrary value 100 is given to a control composition, a result greater than 100 indicating an increase in the tan(δ)$_{-20°\,C.}$ value, therefore corresponding to an improvement in the wet grip performance.

tan(δ)$_{-20°\,C.}$ result (base 100)=(tan(δ)$_{-20°\,C.}$ value of the test sample×100)/(tan(δ)$_{-20°\,C.}$ value of the control).

The G*$_{-20°\,C.}$ results are indicated in base 100 and are obtained in the following manner: the G*$_{-20°\,C.}$ result obtained for a test sample is calculated in base 100, the arbitrary value 100 being assigned to the control:

G*$_{-20°\,C.}$ result (base 100)=(G*$_{-20°\,C.}$ value of the test sample×100)/(G*$_{-20°\,C.}$ value of the control).

In this way, a result less than 100 indicates a decrease in the G*$_{-20°\,C.}$ (which is favourable to the grip on snow-covered ground).

2—DETAILED DESCRIPTION OF THE INVENTION

The invention and the advantages thereof will be readily understood in the light of the description and the implementation examples.

A first subject of the present invention relates to a rubber composition based on at least:
- a diene elastomer;
- a reinforcing inorganic filler;
- an agent for coupling the reinforcing inorganic filler with the diene elastomer, said coupling agent being an organofunctional silane comprising at least one oligomer bearing at least one blocked mercaptosilane unit and at least one mercaptosilane unit, the oligomer corresponding to general formula (I) below:

$$(A)_p(B)_q \quad (I)$$

in which
A is a symbol representing a blocked mercaptosilane unit corresponding to general formula (II):

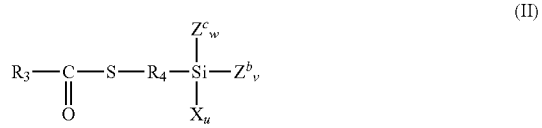

(II)

B is a symbol representing a mercaptosilane unit corresponding to general formula (III)

(III)

in which formulae (II) and (III):
$R_3$ represents a group chosen from a hydrogen atom, a linear or branched C1-C18 alkyl and a linear or branched C2-C18 alkenyl,
each $R_4$, which may be identical or different, represents a saturated, linear or branched C1-C6 divalent hydrocarbon-based group,
each $Z^b$ forms a bridging structure between a silicon atom of one unit and a silicon atom of another unit, these units possibly being identical or different, and is chosen from the group consisting of $(-O-)_{0.5}$ and $[-O(R^OCR^O)_fO-]_{0.5}$ with $R^O$, which may be identical or different, representing a group chosen from a hydrogen atom, methyl, ethyl and propyl and f representing a number within a range extending from 2 to 15,
each $Z^c$, which may be identical or different, forms a cyclic structure with the silicon atom of one unit and is $[-O(R^OCR^O)_fO-]_{0.5}$ with $R^O$ and f as defined previously,
each X, which may be identical or different, is chosen from the group consisting of a hydrogen atom, a hydroxyl group, a C1-C6 alkyl group, a C1-C6 alkoxy group and a group) HO(R$^O$CR$^O$)$_f$O— with $R^O$ and f as defined previously,
with u+v+2w=3 in which u is a number equal to 0, 1, 2 or 3, v is a number equal to 1, 2 or 3 and w is a number equal to 0 or 1,
p is a number within a range extending from 1 to 20,
q is a number within a range extending from 1 to 20, and
a hydrocarbon-based resin predominantly composed of monomers chosen from the group consisting of cyclopentadiene, dicyclopentadiene, methylcyclopentadiene and mixtures thereof, and
a crosslinking system.

The term "composition based on" should be understood as meaning a composition including the mixture and/or the in situ reaction product of the various constituents used, some of these constituents being capable of reacting and/or being intended to react with each other, at least in part, during the various phases of manufacture of the composition.

In the present description, unless expressly indicated otherwise, all the percentages (%) shown are mass percentages.

Furthermore, any range of values denoted by the expression "between a and b" represents the range of values extending from more than "a" to less than "b" (i.e. limits a and b excluded), while any range of values denoted by the expression "from a to b" means the range of values extending from "a" up to "b" (i.e. including the strict limits a and b).

In the present patent application, the term "phr" means parts by weight of a constituent per hundred parts by weight of elastomer.

In the context of the invention, the carbon-based products mentioned in the description may be of fossil or biosourced origin. In the latter case, they may be partially or totally derived from biomass or may be obtained from renewable starting materials derived from biomass. Polymers, plasticizers, fillers and the like are notably concerned.

2.1—Constituents of the Rubber Composition
Diene Elastomer

As mentioned previously, the compositions in accordance with the invention comprise at least one diene elastomer.

It is recalled here that the term "elastomer" (or "rubber", the two terms being regarded as synonymous) of the "diene" type should be understood, in a known manner, as meaning an (one or more is understood) elastomer at least partly derived (i.e., a homopolymer or a copolymer) from diene monomer(s) (i.e. monomer(s) bearing two conjugated or non-conjugated carbon-carbon double bonds).

Diene elastomers may be classified in two categories: "essentially unsaturated" or "essentially saturated". The term "essentially unsaturated" generally refers to a diene elastomer resulting at least in part from conjugated diene monomers having a molar content of units of diene origin (conjugated dienes) which is greater than 15% (mol %); thus, diene elastomers such as butyl rubbers or copolymers of dienes and of α-olefins of EPDM type do not fall under the preceding definition and may notably be termed "essentially saturated" diene elastomers (low or very low molar content, always less than 15% (mol %), of units of diene origin). In the category of "essentially unsaturated" diene elastomers, the term "highly unsaturated" diene elastomer in particular refers to a diene elastomer having a molar content of units of diene origin (conjugated dienes) which is greater than 50% (mol %).

Given these definitions, the term "diene elastomer that is capable of being used in the rubber compositions in accordance with the invention" more particularly refers to:
(a) any homopolymer obtained by polymerization of a conjugated diene monomer containing from 4 to 12 carbon atoms;
(b) any copolymer obtained by copolymerization of one or more conjugated dienes with each other or with one or more vinylaromatic compounds containing from 8 to 20 carbon atoms;
(c) a ternary copolymer obtained by copolymerization of ethylene and of an α-olefin containing from 3 to 6 carbon atoms with a non-conjugated diene monomer containing from 6 to 12 carbon atoms, for instance the elastomers obtained from ethylene and propylene with a non-conjugated diene monomer of the abovementioned type, notably such as 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer.

Although it applies to any type of elastomer, notably diene elastomer, a person skilled in the art will understand that the present invention is preferably performed with essentially unsaturated diene elastomers, in particular of the type (a) or (b) above.

In the case of copolymers (b), they may contain from 20% to 99% by weight of diene units and from 1% to 80% by weight of vinylaromatic units.

The following are notably suitable as conjugated dienes: 1,3-butadiene, 2-methyl-1,3-butadiene, 2,3-di($C_1$-$C_5$ alkyl)-1,3-butadienes, for instance 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

Preferentially, the diene elastomer(s) of the composition according to the invention may be chosen from the group of diene elastomers consisting of polybutadienes (abbreviated to BRs), synthetic polyisoprenes (abbreviated to IRs), natural rubber (abbreviated to NR), butadiene copolymers, isoprene copolymers and the mixtures of these elastomers.

Such copolymers are more preferentially chosen from the group consisting of butadiene/styrene copolymers (abbreviated to SBRs), whether the latter are prepared by emulsion polymerization (ESBR) or solution polymerization (SSBR), isoprene/butadiene copolymers (abbreviated to BIRs), isoprene/styrene copolymers (abbreviated to SIRs) and isoprene/butadiene/styrene copolymers (abbreviated to SBIRs).

More preferentially, the diene elastomer(s) of the composition according to the invention may be chosen from the group of diene elastomers consisting of polybutadienes, butadiene-styrene copolymers, isoprene-butadiene copolymers, isoprene-styrene copolymers, isoprene-butadiene-styrene copolymers, and mixtures of these elastomers.

The elastomers may have any microstructure, which depends on the polymerization conditions used, notably on the presence or absence of a modifying and/or randomizing agent and on the amounts of modifying and/or randomizing agent used. These elastomers may, for example, be block, random, sequential or microsequential elastomers and may be prepared in dispersion or in solution; they may be coupled and/or star-branched or else functionalized with a coupling and/or star-branching or functionalization agent.

According to a preferred embodiment, the elastomer is a functionalized diene elastomer.

Preferably, the functionalized diene elastomer is chosen from the group of diene elastomers consisting of polybutadienes, synthetic polyisoprenes, butadiene copolymers, isoprene copolymers, and mixtures of these elastomers. Even more preferentially, the functionalized elastomer is a butadiene-styrene copolymer.

Preferably, the functionalized diene elastomer has a glass transition temperature Tg of less than or equal to −40° C., preferably within a range extending from −110° C. to −40° C., more preferentially from −110° C. to −60° C., even more preferentially from −110° C. to −80° C.

The term "functionalized diene elastomer" refers to a synthetic diene elastomer which includes at least one chemical group comprising one or more heteroatoms, for instance a sulfur atom S, a nitrogen atom N, an oxygen atom O, a silicon atom Si or a tin atom Sn. In the context of the present description, this chemical group is also referred to as "function". The two terms are used without distinction.

This chemical group may be located at the chain end, that is to say at one end of the linear main elastomer chain. It will then be said that the diene elastomer is functionalized "at the chain end". It is generally an elastomer obtained by reaction of a living elastomer with a functionalization agent, that is to say any at least monofunctional molecule, the function being any type of chemical group known to those skilled in the art to react with a living chain end.

This chemical group may be located in the linear main elastomer chain. It will then be said that the diene elastomer is coupled or else functionalized "in the middle of the chain", as opposed to the position "at the chain end" and although the group is not located precisely at the middle of the elastomer chain. It is generally an elastomer obtained by reaction of two chains of the living elastomer with a coupling agent, that is to say any at least difunctional molecule, the function being any type of chemical group known to those skilled in the art to react with a living chain end.

This group may be central, to which n elastomer chains (n>2) are bonded, forming a star-branched structure of the elastomer. It will then be said that the diene elastomer is star-branched. It is generally an elastomer obtained by reaction of n chains of the living elastomer with a star-branching agent, that is to say any polyfunctional molecule, the function being any type of chemical group known to those skilled in the art to react with a living chain end.

A person skilled in the art will understand that a functionalization reaction with an agent comprising more than one function which is reactive with regard to the living elastomer results in a mixture of species functionalized at the chain end and in the middle of the chain, constituting the linear chains of the functionalized diene elastomer, and also, where appropriate, star-branched species. Depending on the operating conditions, mainly the mole ratio of the functionalization agent to the living chains, certain species are predominant in the mixture.

Preferentially, the functionalized diene elastomer comprises at least one polar function comprising at least one oxygen atom.

Preferentially, the polar function may be chosen from the group consisting of silanol, alkoxysilanes, alkoxysilanes bearing an amine group, epoxide, ethers, esters, carboxylic acids and hydroxyl. The polar function notably improves the interaction between the reinforcing inorganic filler and the elastomer. Such functionalized elastomers are known per se and are described notably in the following documents: FR2740778, U.S. Pat. No. 6,013,718, WO2008/141702, FR2765882, WO01/92402, WO2004/09686, EP1127909, U.S. Pat. No. 6,503,973, WO2009/000750 and WO 2009/000752.

In a preferred embodiment, the functionalized diene elastomer is a diene elastomer including a polar function that is a silanol.

Preferably, the functionalized diene elastomer comprises, at one end of its main chain, a silanol function or a polysiloxane group bearing a silanol end of formula —$(SiR_1R_2$—O—$)_mH$ with m representing an integer ranging from 3 to 8, preferably 3, $R_1$ and $R_2$, which may be identical or different, represent an alkyl radical of 1 to 10 carbon atoms, preferably an alkyl radical containing 1 to 4 carbon atoms.

This type of elastomer may be obtained according to the processes described in EP 0778311 and more particularly according to the process consisting, after a step of anionic polymerization, in functionalizing the living elastomer with a functionalization agent of cyclic polysiloxane type, as long as the reaction medium does not allow the polymerization of the cyclopolysiloxane. Cyclic polysiloxanes that may be mentioned include those corresponding to formula (VII):

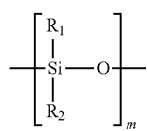

(VII)

where m represents an integer ranging from 3 to 8, preferably 3, and $R_1$ and $R_2$, which may be identical or different, represent an alkyl radical of 1 to 10 carbon atoms, preferably an alkyl radical containing 1 to 4 carbon atoms. Among these compounds, mention may be made of hexamethylcyclotrisiloxane.

In another preferred embodiment of the invention, the functionalized diene elastomer includes a polar function which is an alkoxysilane optionally bearing another function (or bearing another chemical group, these expressions being synonymous).

Preferably, this functionalized diene elastomer comprises in its main chain at least one alkoxysilane group bonded to the elastomer chain via the silicon atom, and optionally bearing at least one other function.

According to certain preferred variants, the alkoxysilane group (optionally bearing another function) is located at one end of the main chain of the elastomer.

According to other preferred variants, the alkoxysilane group (optionally bearing another function) is located in the main elastomer chain. The silicon atom of this function bonds the two branches of the main chain of the diene elastomer.

The alkoxysilane group (optionally bearing another function) comprises a $C_1$-$C_{10}$ alkoxy radical, optionally partially or totally hydrolysed to hydroxyl, or even a $C_1$-$C_8$, preferably $C_1$-$C_4$ alkoxy radical, and is more preferentially methoxy and ethoxy.

The other function is preferably borne by the silicon of the alkoxysilane group, directly or via a spacer group, defined as being a saturated or unsaturated, cyclic or non-cyclic, divalent, linear or branched, aliphatic $C_1$-$C_{18}$ hydrocarbon-based radical, or a divalent aromatic C6-$C_{18}$ hydrocarbon-based radical.

The other function is preferably a function comprising at least one heteroatom chosen from N, S, O or P. Mention may be made, by way of example, among these functions, of cyclic or non-cyclic primary, secondary or tertiary amines, isocyanates, imines, cyanos, thiols, carboxylates, epoxides or primary, secondary or tertiary phosphines.

Mention may thus be made, as secondary or tertiary amine function, of amines substituted with $C_1$-$C_{10}$ alkyl, preferably $C_1$-$C_4$ alkyl, radicals, more preferentially a methyl or ethyl radical, or else of cyclic amines forming a heterocycle containing a nitrogen atom and at least one carbon atom, preferably from 2 to 6 carbon atoms. For example, methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino-groups, preferably diethylamino- and dimethylamino-groups, are suitable.

Mention may be made, as imine function, of ketimines. For example, (1,3-dimethylbutylidene)amino-, (ethylidene)amino-, (1-methylpropylidene)amino-, (4-N,N-dimethylaminobenzylidene)amino-, (cyclohexylidene)amino-, dihydroimidazole and imidazole groups are suitable.

Mention may thus be made, as carboxylate function, of acrylates or methacrylates. Such a function is preferably a methacrylate.

Mention may be made, as epoxide function, of epoxy or glycidyloxy groups.

Mention may be made, as secondary or tertiary phosphine function, of phosphines substituted with $C_1$-$C_{10}$ alkyl, preferably $C_1$-$C_4$ alkyl, radicals, more preferentially a methyl or ethyl radical, or else diphenylphosphine. For example, methylphosphino-, dimethylphosphino-, ethylphosphino-, diethylphosphino, ethylmethylphosphino- and diphenylphosphino-groups are suitable.

Preferentially, the other function is preferably a tertiary amine, more preferentially a diethylamino- or dimethylamino-group.

Preferentially, the functionalized diene elastomer (notably an SBR) may comprise a polar function which is an alkoxysilane optionally bearing an amine group.

Preferably, this functionalized diene elastomer comprises in its main chain at least one alkoxysilane group bonded to the elastomer chain via the silicon atom, and optionally bearing an amine group.

Preferably, this alkoxysilane group may be represented by formula (VIII):

(*—)$_a$Si(OR')$_b$R$_c$X  (VIII)

in which:
*— represents the bond to an elastomer chain;
the radical R represents a substituted or unsubstituted C$_1$-C$_{10}$, or even C$_1$-C$_8$, alkyl radical, preferably a C$_1$-C$_4$ alkyl radical, more preferentially methyl and ethyl;
in the alkoxy radical(s) of formula —OR', which are optionally partially or totally hydrolysed to hydroxyl, R' represents a substituted or unsubstituted C$_1$-C$_{10}$, or even C$_1$-C$_8$, alkyl radical, preferably a C$_1$-C$_4$ alkyl radical, more preferentially methyl and ethyl;
X represents a group including the other function;
a is equal to 1 or 2, b is equal to 1 or 2, and c is equal to 0 or 1, with the proviso that a+b+c=3.

More preferentially, the functionalized diene elastomer is a diene elastomer (notably an SBR) comprises, within the main chain thereof, at least one alkoxysilane group of formula (VIII) in which:
*— represents the bond to an elastomer chain;
the radical R represents a substituted or unsubstituted C$_1$-C$_4$ alkyl radical, more preferentially methyl and ethyl;
in the alkoxy radical(s) of formula —OR', which are optionally partially or totally hydrolysed to hydroxyl, R' represents a substituted or unsubstituted C$_1$-C$_4$ alkyl radical, more preferentially methyl and ethyl;
X represents a group including the other function; preferably a tertiary amine;
a is equal to 1 or 2, b is equal to 1 or 2, and c is equal to 0 or 1, with the proviso that a+b+c=3.

This type of elastomer is mainly obtained by functionalization of a living elastomer derived from an anionic polymerization. It should be pointed out that it is known to those skilled in the art that when an elastomer is modified by reaction of a functionalization agent with the living elastomer derived from a step of anionic polymerization, a mixture of modified species of this elastomer is obtained, the composition of which depends on the modification reaction conditions and notably on the proportion of reactive sites of the functionalization agent relative to the number of living elastomer chains. This mixture comprises species which are functionalized at the chain end, coupled, star-branched and/or non-functionalized.

According to a particularly preferred variant, the modified diene elastomer comprises, as predominant species, the diene elastomer functionalized in the middle of the chain with an alkoxysilane group bonded to the two branches of the diene elastomer via the silicon atom. Even more particularly, the diene elastomer functionalized in the middle of the chain with an alkoxysilane group represents 70% by weight of the modified diene elastomer. Preferably, this functionalized diene elastomer has a glass transition temperature Tg of less than or equal to −40° C., preferably within a range extending from −110° C. to −40° C., more preferentially from −110° C. to −60° C., even more preferentially from −110° C. to −80° C.

Whether or not they are functionalized, the diene elastomers may be used blended (mixed) with each other. Thus, the rubber compositions in accordance with the invention may contain just one diene elastomer, functionalized or non-functionalized, or else a mixture of several diene elastomers, functionalized or non-functionalized, it being possible for this (these) diene elastomer(s) to be used in combination with any type of synthetic elastomer other than a diene elastomer, or even with polymers other than elastomers, for example thermoplastic polymers.

Reinforcing Filler

The rubber compositions in accordance with the invention comprise at least one reinforcing inorganic filler.

In the present patent application, the term "reinforcing inorganic filler" should be understood, by definition, as meaning any inorganic or mineral filler (regardless of its colour and its origin, natural or synthetic), also known as "white filler", "clear filler" or even "non-black filler", as opposed to carbon black, which is capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface.

The physical state in which the reinforcing inorganic filler is provided is not important, whether it be in the form of a powder, of micropearls, of granules, of beads or any other appropriate densified form. Needless to say, the term "reinforcing inorganic filler" also means mixtures of different reinforcing inorganic fillers, in particular of highly dispersible siliceous and/or aluminous fillers as described below.

Mineral fillers of the siliceous type, in particular silica (SiO$_2$), or of the aluminous type, in particular alumina (Al$_2$O$_3$), are notably suitable for use as reinforcing inorganic fillers. The silica used may be any reinforcing silica known to those skilled in the art, notably any precipitated or fumed silica with a BET specific surface area and also a CTAB specific surface area both of less than 450 m$^2$/g, preferably from 30 to 400 m$^2$/g. Mention will be made, as highly dispersible precipitated silicas ("HDSs"), for example, of the Ultrasil 7000 and Ultrasil 7005 silicas from the company Evonik, the Zeosil 1165MP, 1135MP and 1115MP silicas from the company Solvay, the Hi-Sil EZ150G silica from the company PPG, the Zeopol 8715, 8745 and 8755 silicas from the company Huber or the silicas with a high specific surface area as described in patent application WO 03/016387.

Preferably, the reinforcing inorganic filler comprises at least one silica, and more preferentially consists of silica.

Preferably, the reinforcing inorganic filler used, in particular if it is silica, has a BET specific surface area of between 45 and 400 m$^2$/g, more preferentially of between 60 and 300 m$^2$/g. The BET specific surface area and the CTAB specific surface area are obtained according to the methods described previously.

A person skilled in the art will understand that use might be made, as filler equivalent to the reinforcing inorganic filler described in the present section, of a reinforcing filler of another nature, notably organic nature, provided that this reinforcing filler is covered with an inorganic layer, such as silica, or else includes, at its surface, functional sites, notably hydroxyl sites, requiring the use of a coupling agent in order to establish the bond between the filler and the elastomer.

Preferably, the content of reinforcing inorganic filler in the rubber compositions in accordance with the invention is within a range extending from 5 to 200 phr, more preferentially from 40 to 160 phr.

In a preferred embodiment, the rubber composition in accordance with the invention also comprises an organic reinforcing filler, preferably carbon black.

Organic reinforcing fillers that are notably suitable include carbon blacks or functionalized polyvinyl organic fillers, as described in patent applications WO-A-2006/069792, WO-A-2006/069793, WO-A-2008/003434 and WO-A-2008/003435.

In this embodiment, the organic reinforcing filler is carbon black. All carbon blacks, notably "tyre-grade" blacks, are suitable as carbon blacks. Mention will more particularly be made, among the latter, of the reinforcing carbon blacks of the 100, 200 or 300 series (ASTM grades), for instance the N115, N134, N234, N326, N330, N339, N347 or N375 blacks, or else, depending on the applications targeted, the blacks of higher series (for example N660, N683 or N772). The carbon blacks may, for example, be already incorporated in an isoprene elastomer in the form of a masterbatch (see, for example, patent application WO 97/36724 or WO 99/16600).

When it is present, the carbon black is preferentially used in a content within a range extending from 0.1 to 10 phr, more preferentially from 0.5 to 10 phr, notably from 1 to 4 phr.

Coupling Agent

As mentioned previously, the rubber composition in accordance with the invention comprises at least one agent for coupling the reinforcing inorganic filler with the elastomer. This coupling agent is an organofunctional silane comprising at least one oligomer bearing at least one blocked mercaptosilane unit and at least one mercaptosilane unit, the oligomer corresponding to general formula (I) below:

$(A)_p(B)_q$          (I)

in which

A is a symbol representing a blocked mercaptosilane unit corresponding to general formula (II)

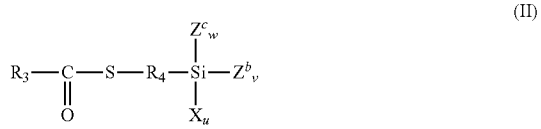

(II)

B is a symbol representing a mercaptosilane unit corresponding to general formula (III)

(III)

in which formulae (II) and (III):
  $R_3$ represents a group chosen from a hydrogen atom, a linear or branched C1-C18 alkyl and a linear or branched C2-C18 alkenyl,
  each $R_4$, which may be identical or different, represents a saturated, linear or branched C1-C6 divalent hydrocarbon-based group,
  each $Z^b$ forms a bridging structure between a silicon atom of one unit and a silicon atom of another unit, these units possibly being identical or different, and is chosen from the group consisting of $(-O-)_{0.5}$ and $[-O(R^oCR^o)_fO-]_{0.5}$ with $R^o$, which may be identical or different, representing a group chosen from a hydrogen atom, methyl, ethyl and propyl and f representing a number within a range extending from 2 to 15,
  each $Z^c$, which may be identical or different, forms a cyclic structure with the silicon atom of one unit and is $[-O(R^oCR^o)_fO-]_{0.5}$ with $R^o$ and f as defined previously,
  each X, which may be identical or different, is chosen from the group consisting of a hydrogen atom, a hydroxyl group, a C1-C6 alkyl group, a C1-C6 alkoxy group and a group) $HO(R^oCR^o)_f$ O— with $R^o$ and f as defined previously,
  with u+v+2w=3 in which u is a number equal to 0, 1, 2 or 3, v is a number equal to 1, 2 or 3 and w is a number equal to 0 or 1,
  p is a number within a range extending from 1 to 20,
  q is a number within a range extending from 1 to 20.

For the purposes of the present invention, the term "organofunctional silane" means a molecule (or a set of molecules) which has the characteristic of bearing at least one mercapto group and/or one blocked mercapto group and at least one hydroxyalkoxysilyl group and/or one cyclic dialkoxysilyl group.

The term "oligomer" usually means a molecule consisting of a set of repeating units (also known simply as units) bonded together covalently forming a single chain; this molecule being smaller in size than a polymer. The term "oligomer" includes dimers, trimers, tetramers and any other molecules containing more than four repeating units, it being understood that these molecules do not constitute a polymer.

The term "mercaptosilane unit" means a repeating unit whose molecular structure contains at least one silicon atom and a mercapto (—SH) group (also known as a thiol group) bonded to a carbon atom.

The term "blocked mercaptosilane unit" means a repeating unit whose structure contains at least one silicon atom and at least one blocked mercapto group (also known as a blocked thiol group). A blocked mercapto group may be, for example, a thioester group —S—(CO)—R.

In the oligomer of general formula (I), the sequence of the blocked mercaptosilane repeating units (A) and of the mercaptosilane repeating units (B) is immaterial. In particular, this sequence may be alternating (for example ABABA B), in blocks (for example AA ABB B) or statistical, i.e. the sequential distribution of said units (A) and (B) obeys known statistical laws.

The term "bridging structure" means a chemical structure made of covalent bond(s) making it possible to bond two repeating units together, these repeating units possibly being identical or different.

Preferably, in general formula (II), $R_3$ is chosen from a hydrogen atom, a linear or branched C1-C10 alkyl and a linear or branched C2-C10 alkenyl.

Preferably, in general formula (II), $R_3$ is a linear C6-C8 alkyl.

Preferably, in general formula (II), $R_3$ is chosen from the group consisting of hexyl, heptyl and octyl.

More preferentially, in general formula (II), $R_3$ is heptyl ($C_7H_{15}$—).

Preferably, in general formulae (II) and (III), each $R_4$, which may be identical or different, is a divalent hydrocarbon-based group chosen from the group consisting of methylene, ethylene, propylene and butylene.

More preferentially, in general formulae (II) and (III), each $R_4$ is identical and is propylene.

Preferably, in general formulae (II) and (III), $Z^b$ forms a bridging structure between a silicon atom of one unit and another silicon atom of another unit, these units possibly being identical or different, and is chosen from the group consisting of $(-O-)_{0.5}$, $[-OCH_2CH_2CH_2O-]_{0.5}$, $[-OCH_2CH_2CH_2CH_2O-]_{0.5}$ and $[-OCH_2CH(CH_3)CH_2O-]_{0.5}$.

More preferentially, in general formulae (II) and (III), $Z^b$ forms a bridging structure between a silicon atom of one unit and another silicon atom of another unit, these units possibly being identical or different, and is chosen from the group consisting of $(-O-)_{0.5}$ or $[-OCH_2CH(CH_3)CH_2O-]_{0.5}$.

Preferably, in general formulae (II) and (III), $Z^c$ forms a cyclic structure with the silicon atom of one unit and is chosen from the group consisting of $[-OCH_2CH_2CH_2O-]_{0.5}$, $[-OCH_2CH_2CH_2CH_2O-]_{0.5}$ and $[-OCH_2CH(CH_3)CH_2O-]_{0.5}$.

More preferentially, in general formulae (II) and (III), each $Z^c$ forms a cyclic structure with the silicon atom of one unit, and is $[-OCH_2CH(CH_3)CH_2O-]_{0.5}$.

Preferably, in general formulae (II) and (III), each X, which may be identical or different, is chosen from the group consisting of hydroxyl, methoxy, ethoxy, methyl, ethyl, 3-hydroxypropoxy, 3-hydroxy-2-methylpropoxy and 4-hydroxybut-1-oxy.

More preferentially, in general formulae (II) and (III), each X is identical and is chosen from the group consisting of hydroxyl, methoxy, ethoxy and 3-hydroxy-2-methylpropoxy.

Preferably, in formulae (II) and (III), $R_3$ is heptyl ($C_7H_{15}-$), each $R_4$ is propylene, $Z^b$ is a bridging structure between a silicon atom of one unit and another silicon atom of another unit and is chosen from the group consisting of $(-O-)_{0.5}$ or $[-OCH_2CH(CH_3)CH_2O-]_{0.5}$, each $Z^c$ forms a cyclic structure with the silicon atom of one unit and is $[-OCH_2CH(CH_3)CH_2O-]_{0.5}$, each X is chosen from the group consisting of hydroxyl, methoxy, ethoxy and 3-hydroxy-2-methylpropoxy, with u+v+2w=3 in which u is 0, 1, 2 or 3, v is 1, 2 or 3 and w is 0 or 1.

The notations $(-O-)_{0.5}$ and $[-O(R^0CR^0)_fO-]_{0.5}$ relate to half of a siloxane bond and to half of a bridging dialkoxy group, respectively. These notations are used together with a silicon atom of the repeating units of the oligomer. They denote half of an oxygen atom, i.e. the half of the oxygen atom that is bonded to the silicon atom of one repeating unit or half of a dialkoxy group, i.e. the half of the atom of the dialkoxy group that is bonded to the silicon atom of one repeating unit; it being understood that the other half of the oxygen atom or of the dialkoxy group, respectively, is bonded to another silicon atom of another repeating unit of the structure of the oligomer; the repeating units possibly being identical or different. Thus, $(-O-)_{0.5}$ forms a siloxane bond between two silicon atoms each belonging to a repeating unit. $[-O(R^0CR^0)_fO-]_{0.5}$ may form either a bridging structure (this intermolecular structure being represented by $Z^b$) between two silicon atoms each belonging to a repeating unit, i.e. a cyclic structure (this intramolecular structure is represented by Ze), the two oxygen atoms of $[-O(R^0CR^0)_fO-]_{0.5}$ being bonded to the silicon atom of the unit. A person skilled in the art will understand that, in the oligomer of formula (I), the bridging structures may be identical or different between the repeating units. For example, there may be only bridging structures of the type —Si—O($R^0CR^0$)$_f$O—Si— or else a mixture of bridging structures of the type —Si—O($R^0CR^0$)$_f$O—Si— and of the type —Si—O—Si—.

The organofunctional silane coupling agent that may be used in the compositions of the invention may be obtained by means of a synthetic process comprising at least one step (a) of transesterification reaction:

of a diol compound of general formula (IV):

$$OH(R^0CR^0)_fOH \qquad (IV)$$

in which $R^0$ and f are as defined previously, i.e. $R^0$, which may be identical or different, represents a group chosen from a hydrogen atom, methyl, ethyl and propyl, and f represents a number ranging from 2 to 15, with at least one blocked mercaptosilane compound of general formula (V):

$$(RO)_3SiR_4SC(=O)R_3 \qquad (V)$$

in which R, which may be identical or different, represents a linear C1-C6 alkyl group, $R_3$ and $R_4$ are as defined previously, i.e. $R_4$ represents a saturated, linear or branched C1-C6 divalent hydrocarbon-based group; $R_3$ represents a group chosen from a hydrogen atom, a linear or branched C1-C18 alkyl and a linear or branched C2-C18 alkenyl, and with at least one mercaptosilane compound of general formula (VI):

$$(RO)_3SiR_4SH \qquad (VI)$$

in which R and $R_4$ have the same definition as previously, i.e. R, which may be identical or different, represents a linear C1-C6 alkyl group, $R_4$ represents a saturated, linear or branched C1-C6 divalent hydrocarbon-based group.

This transesterification reaction is well known to those skilled in the art and may be performed in the presence of a transesterification catalyst, for instance strong acids.

Preferentially, in the process described above, the diol compound of general formula (IV) is chosen from $HOCH_2CH_2CH_2OH$, $HOCH_2CH_2CH_2CH_2OH$ and $HOCH_2CH(CH_3)CH_2OH$.

More preferentially, in the process described above, the diol compound of general formula (IV) is $HOCH_2CH(CH_3)CH_2OH$.

Preferentially, the compounds of general formulae (V) and (VI) used in the implementation of the process described above are those in which the group R is chosen from methyl, ethyl, propyl, isopropyl, n-butyl and isobutyl.

Preferentially, the compounds of general formula (V) used in the implementation of the process described above are those in which $R_3$ represents a group chosen from a hydrogen atom, a linear or branched C1-C10 alkyl and a linear or branched C2-C10 alkenyl.

More preferentially, the compounds of general formula (V) used in the implementation of the process described above are those in which $R_3$ is a linear C6-C8 alkyl.

Even more preferentially, the compounds of general formula (V) used in the implementation of the process described above are those in which $R_3$ is chosen from the group consisting of hexyl, heptyl and octyl.

More preferentially, the compounds of general formula (V) used in the implementation of the process described above are those in which $R_3$ is heptyl ($C_7H_{15}-$).

Preferably, the compounds of general formulae (V) and (VI) used in the implementation of the process described above are those in which $R_4$, which may be identical or different, is a divalent hydrocarbon-based group chosen from the group consisting of methylene, ethylene, propylene and butylene.

More preferentially, the compounds of general formulae (V) and (VI) used in the implementation of the process described above are those in which $R_4$ is identical and is propylene.

Preferentially, the compounds of general formulae (V) and (VI) used in the implementation of the process described above are those in which $R_3$ is heptyl, $R_4$ is propylene, R, which may be identical or different (preferably identical) is chosen from methyl, ethyl, propyl, isopropyl, n-butyl and isobutyl and the compound of formula (IV) used in the implementation of the process described above is $HOCH_2CH(CH_3)CH_2OH$.

Mixtures of monomers (compounds of general formula (V) and compounds of general formula (VI)) may be used for synthesizing the organofunctional silane that may be used in the compositions of the invention.

Preferentially, the process for synthesizing the organofunctional silane coupling agent may comprise, in addition:
- at least one step (b) of treating the products obtained in step (a) to convert some of the blocked mercapto groups, if present in the products obtained in step (a), into free mercapto groups (—SH) and/or
- at least one step (c) of treating the products obtained in step (a) to convert some of the mercapto groups, if present in the products obtained in step (a), into blocked mercapto groups and/or
- at least one step (d) of partial hydrolysis of the products obtained in step (a), of the products obtained in step (b) if this step is performed in the process, and of the products obtained in step (c) if this step is performed in the process.

The treatment step (b) may be, for example, a step in which a strong base is used, for example NaOEt, to remove the blocked mercapto groups borne by the products obtained in step (a) and to obtain free mercapto groups borne by the products obtained in step (a).

The treatment step (c) may be, for example, a step of esterification of the free mercapto groups by the products obtained in step (a) using a carboxylic acid (notably $C_7H_{15}COOH$) or an acyl chloride (notably $C_7H_{15}COCl$) to obtain blocked mercapto groups borne by the products obtained in step (a).

The partial hydrolysis step (d) may be present when there is an excess of water relative to the products and reagents used in step (a) and optionally steps (b) and (c), if present. The partial hydrolysis step makes it possible to obtain the compounds described above in which $Z^b=(-O-)_{0.5}$ and/or X=OH.

A person skilled in the art can refer notably to WO 2007/098120 A2, which describes the process for producing the organofunctional silane coupling agent that may be used in the rubber compositions of the invention.

Preferentially, the organofunctional silane coupling agent that may be used in the present invention may comprise other organofunctional silanes in addition to the oligomer of formula (I), these silanes being reaction products obtained by performing the synthetic process described above.

For example, the organofunctional silane coupling agent may comprise, in addition, at least:
 i. one compound derived from general formula (II) in which $R_3$, $R_4$, $Z^c_w$ and $X_u$ have the same definition as in formula (II) and in which the group $Z^b_v$ is replaced with a group $Z^a_t$, with $Z^a$ having the same definition as the group X, u+t+2w=3 with t being a number equal to 0, 1, 2 or 3 and u and w having the same definition as in formula (II),
 ii. one compound derived from general formula (III) in which $R_3$, $R_4$, $Z^c_w$ and $X_u$ have the same definition as in formula (III) and in which the group $Z^b_v$ is replaced with a group $Z^a_t$, with $Z^a$ having the same definition as the group X, u+t+2w=3 with t being a number equal to 0, 1, 2 or 3 and u and w having the same definition as in formula (III),
 iii. one dimer consisting of two blocked mercaptosilane units of formula (II),
 iv. one dimer consisting of two mercaptosilane units of formula (III),
 v. one dimer consisting of a blocked mercaptosilane unit (II) and a mercaptosilane unit of formula (III),
 vi. one oligomer consisting of blocked mercaptosilane units of formula (II),
 vii. one oligomer consisting of mercaptosilane units of formula (III).

Preferentially, the organofunctional silane (which may notably be obtained via the abovementioned process) has a molar percentage of blocked mercaptosilane units that is within a range extending from 20% to 80%, preferably from 40% to 60%.

Preferentially, the organofunctional silane (which may notably be obtained via the abovementioned process) has a molar percentage of mercaptosilane units that is within a range extending from 20% to 80%, preferably from 40% to 60%.

More preferentially, the organofunctional silane (which may notably be obtained via the abovementioned process) has a molar percentage of blocked mercaptosilane units that is within a range extending from 50% to 55% and the organofunctional silane (which may notably be obtained via the abovementioned process) has a molar percentage of mercaptosilane units that is within a range extending from 45% to 50%.

The molar percentage of blocked mercaptosilane units and the molar percentage of mercaptosilane units in the organofunctional silane that may be used in the compositions of the invention may be determined via any method that is well known to those skilled in the art, for instance $^1H$ NMR.

The organofunctional silane coupling agent that may be used in the rubber compositions of the invention is commercially available from Momentive. Inc. under the commercial reference NXT-Z45.

In one variant of the invention, the coupling agent that may be used in the compositions of the invention may predominantly comprise an organofunctional silane as described above and a second coupling agent, of chemical structure different from this organofunctional silane. This second coupling agent may be, for example, a polysulfide silane.

Preferentially, in this embodiment, the coupling agent that may be used in the compositions of the invention comprises at least 70% by weight of an organofunctional silane as described above relative to the total weight of the coupling agents used and a second coupling agent of chemical structure different from this organofunctional silane; this second coupling agent notably being present in a content of not more than 30% by weight relative to the total weight of the coupling agents used. This second coupling agent may be, for example, a polysulfide silane.

Polysulfide silanes are well known to those skilled in the art and are used as agent for coupling a reinforcing inorganic filler with elastomers in rubber compositions.

The polysulfide silanes may be "symmetrical" or "asymmetrical" depending on their particular structure. Such compounds are described, for example, in patent applications WO 03/002648 (or US 2005/016651) and WO 03/002649 (or US 2005/016650).

Agents that are suitable in particular, without the definition below being limiting, are "symmetrical" polysulfide silanes, corresponding to general formula (VII) below:

$$Z\text{-}D\text{-}S_x\text{-}D\text{-}Z \qquad \text{(VII)}$$

in which:
x is an integer from 2 to 8 (preferably from 2 to 5);
the symbols D, which may be identical or different, represent a divalent hydrocarbon-based radical (preferably $C_1\text{-}C_{18}$ alkylene groups or $C_6\text{-}C_{12}$ arylene groups, more particularly $C_1\text{-}C_{10}$ and notably $C_1\text{-}C_4$ alkylenes, in particular propylene);
the symbols Z, which may be identical or different, correspond to one of the formulae below:

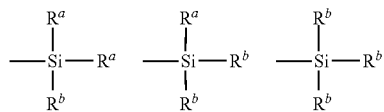

in which:
the radicals $R^a$, which may be substituted or unsubstituted and identical to or different from each other, represent a $C_1\text{-}C_{18}$ alkyl, a $C_5\text{-}C_{18}$ cycloalkyl or a $C_6\text{-}C_{18}$ aryl (preferably a $C_1\text{-}C_6$ alkyl, a cyclohexyl or a phenyl, notably a $C_1\text{-}C_4$ alkyl, more particularly methyl and/or ethyl),
the radicals $R^b$, which may be substituted or unsubstituted and identical to or different from each other, represent a $C_1\text{-}C_{18}$ alkoxyl or a $C_5\text{-}C_{18}$ cycloalkoxyl group (preferably a group selected from $C_1\text{-}C_8$ alkoxyls and $C_5\text{-}C_8$ cycloalkoxyls, even more preferentially a group chosen from $C_1\text{-}C_4$ alkoxyls, in particular methoxyl and ethoxyl).

In the case of a mixture of polysulfide alkoxysilanes corresponding to the above formula (VII), notably normal commercially available mixtures, the mean value of the "x" indices is a fractional number preferably between 2 and 5, more preferentially close to 4. However, the invention may also be advantageously performed, for example, with alkoxysilane disulfides (x=2).

As examples of polysulfide silanes, mention will be made more particularly of bis(($C_1\text{-}C_4$)alkoxyl($C_1\text{-}C_4$)alkylsilyl ($C_1\text{-}C_4$)alkyl) polysulfides (notably disulfides, trisulfides or tetrasulfides), for instance bis(3-trimethoxysilylpropyl) or bis(3-triethoxysilylpropyl) polysulfides. Among these compounds, use is made in particular of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Preferential examples that will also be mentioned include bis(mono($C_1\text{-}C_4$)alkoxyldi($C_1\text{-}C_4$) alkylsilylpropyl) polysulfides (notably disulfides, trisulfides or tetrasulfides), more particularly bis(monoethoxydimethylsilylpropyl) tetrasulfide, as described in patent application WO 02/083782 (or US 2004/132880).

Preferentially, the coupling agent used in the compositions of the invention consists of an organofunctional silane comprising at least one oligomer of general formula (I) as described above or a mixture of organofunctional silanes as described above.

In the rubber compositions in accordance with the invention, the content of coupling agent is preferably within a range extending from 1 to 20 phr, from 1 to 15 phr and more preferentially from 3 to 14 phr.

These rubber compositions of the invention may also optionally contain, in addition to the abovementioned coupling agents, coupling activators, agents for covering the inorganic fillers or more generally processing aids that are capable, in a known manner, by means of improving the dispersion of the filler in the rubber matrix and of lowering the viscosity of the compositions, of improving their ability to be processed in the raw state, these agents being, for example, hydrolysable silanes such as alkylalkoxysilanes, polyols, fatty acids, polyethers, primary, secondary or tertiary amines, or hydroxylated or hydrolysable polyorganosiloxanes.

Hydrocarbon-Based Resin

The compositions of the invention comprise at least one specific hydrocarbon-based resin.

This hydrocarbon-based resin is predominantly composed of monomers chosen from the group consisting of cyclopentadiene, dicyclopentadiene, methylcyclopentadiene, and mixtures of these monomers. This resin may optionally be hydrogenated.

The hydrocarbon-based resin is preferably a plasticizing hydrocarbon-based resin.

In a manner known to those skilled in the art, the term "plasticizing resin" is reserved in the present patent application, by definition, for a compound which is, on the one hand, solid at room temperature (23° C.) (as opposed to a liquid plasticizing compound such as an oil) and, on the other hand, compatible (that is to say miscible at the content used, typically of greater than 5 phr) with the rubber composition for which it is intended, so as to act as a true diluent.

Hydrocarbon-based resins are polymers that are well known to those skilled in the art, which are miscible by nature in diene elastomer compositions, when they are also described as "plasticizing". They have been described, for example, in the book entitled "*Hydrocarbon Resins*" by R. Mildenberg, M. Zander and G. Collin (New York, V C H, 1997, ISBN 3-527-28617-9), Chapter 5 of which is devoted to their applications, notably in the tyre rubber field (5.5. "*Rubber Tires and Mechanical Goods*"). They may be aliphatic, aromatic or of the aliphatic/aromatic type, i.e. based on aliphatic and/or aromatic monomers. They may be natural or synthetic and may or may not be petroleum-based (if such is the case, they are also known under as petroleum resins). They are preferentially exclusively hydrocarbon-based, i.e. they include only carbon and hydrogen atoms.

The Applicant has discovered that, among plasticized hydrocarbon-based resins, resins predominantly composed of monomers chosen from the group consisting of cyclopentadiene, dicyclopentadiene, methylcyclopentadiene and mixtures of these monomers used in combination with the organofunctional silane coupling agent as described previously make it possible, surprisingly, to obtain rubber compositions whose rolling resistance is improved without the wet grip being penalized. These compositions also have the advantage of having improved grip on snow-covered ground.

When reference is made to a "predominant monomer" in a hydrocarbon-based resin, this is understood to mean, within the meaning of the present invention, that this monomer is predominant among the monomers forming the resin, that is to say that it is the one which represents the largest mass fraction among the monomers forming the resin. Thus, for example, a hydrocarbon-based resin predominantly composed of cyclopentadiene monomers is a resin in which the cyclopentadiene monomers represent the largest amount by mass among all the monomers making up this hydrocarbon-based resin. Similarly, a hydrocarbon-based resin predominantly composed of monomers chosen from the group consisting of cyclopentadiene, dicyclopentadiene, methylcyclopentadiene and mixtures of these monomers is a hydrocarbon-based resin in which the sum of the monomers chosen from the group consisting of cyclopentadiene, dicyclopentadiene, methylcyclopentadiene and mixtures of these monomers represents the largest amount by mass among all the monomers making up said resin. In other words, a "predominant monomer" is a monomer which represents the largest mass fraction in the resin. On the contrary, a "minor monomer" is a monomer which does not represent the largest mass fraction in the resin.

Preferentially, the optionally hydrogenated hydrocarbon-based resin comprises at least 50% by mass (>50% by mass) of monomers chosen from the group consisting of cyclopentadiene, dicyclopentadiene, methylcyclopentadiene, and mixtures of these monomers, relative to the total mass of all of the monomers of which said resin is constituted.

Preferably, the optionally hydrogenated hydrocarbon-based resin may also comprise, in minor amount, aromatic monomers and/or aliphatic monomers.

Preferentially, the optionally hydrogenated hydrocarbon-based resin comprises not more than 50% by mass (<50% by mass) of aromatic monomers and/or aliphatic monomers relative to the total mass of all of the monomers of which said resin is constituted, and more preferentially comprises not more than 40% by mass (<40% by mass) of aromatic monomers and/or aliphatic monomers.

Examples of aromatic monomers that may be mentioned include monomers chosen from the group consisting of styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene, indene, or any vinylaromatic monomer derived from a C9 fraction (or more generally from a C8, C9 or C10 fraction). Preferably, the vinylaromatic monomer is styrene or a vinylaromatic monomer derived from a C9 fraction.

Examples of aliphatic monomers that may be mentioned include monomers chosen from the group consisting of isoprene, piperylene and amylene.

According to a preferred embodiment, the optionally hydrogenated hydrocarbon-based resin is chosen from the group consisting of cyclopentadiene homopolymer resins, dicyclopentadiene homopolymer resins, methylcyclopentadiene homopolymer resins, and mixtures of these abovementioned homopolymer resins.

Also in a preferred embodiment, the optionally hydrogenated hydrocarbon-based resin may be a mixture of abovementioned homopolymer resins and abovementioned copolymer resins.

According to another embodiment which is also very preferential, the optionally hydrogenated hydrocarbon-based resin is chosen from the group consisting of resins predominantly composed of monomers chosen from the group consisting of cyclopentadiene, dicyclopentadiene, methylcyclopentadiene and mixtures of these monomers and in minor amount composed of aromatic monomers.

The optionally hydrogenated hydrocarbon-based resins that may be used in the compositions of the invention are often called CPD resins or DCPD resins.

The optionally hydrogenated hydrocarbon-based resins are obtained via processes that are well known to those skilled in the art, for instance by thermal polymerization (i.e. without a polymerization catalyst).

Preferably, the optionally hydrogenated hydrocarbon-based resin has a number-average molecular mass Mn within a range extending from 200 to 2000 g/mol, preferably from 200 to 600 g/mol.

Preferably, the optionally hydrogenated hydrocarbon-based resin has a polydispersity index PI of less than or equal to 2, preferably less than or equal to 1.8, preferably less than 1.7.

Preferably, the optionally hydrogenated hydrocarbon-based resin has a glass transition temperature Tg of greater than or equal to 30° C., preferably within a range extending from 30° C. to 80° C.

Preferably, the optionally hydrogenated hydrocarbon-based resin is also composed in minor amount of aromatic monomers.

Preferably, the content of aromatic protons in the optionally hydrogenated hydrocarbon-based resin is within a range extending from 1% to 20%, preferably from 2% to 15% and even more preferentially from 2% to 10%.

Preferably, the optionally hydrogenated hydrocarbon-based resin has a number-average molecular mass Mn within a range extending from 200 to 600 g/mol and a polydispersity index PI of less than or equal to 2, preferably less than or equal to 1.8, preferably less than 1.7.

Preferentially, the content of optionally hydrogenated hydrocarbon-based resin is within a range extending from 15 phr to 150 phr, preferentially from 25 to 120 phr and more preferentially from 30 to 115 phr. This is because, below 15 phr of the hydrocarbon-based resin that is of use for the purposes of the invention, the effect of the resin would be insufficient and the composition might present grip problems, while, above 150 phr, the composition might exhibit a difficulty in manufacturing in order to readily incorporate all of said resin into the composition.

The glass transition temperature, the softening point, the macrostructure (Mn, Mw, PI) and the content of aromatic protons of the optionally hydrogenated hydrocarbon-based resin are determined according to the methods described above.

The optionally hydrogenated hydrocarbon-based resins, predominantly composed of monomers chosen from the group consisting of cyclopentadiene, dicyclopentadiene, methylcyclopentadiene, and mixtures of these monomers, are commercially available from suppliers such as Exxon-Mobil, notably under the references Escorez E5600, Escorez E5415, Escorez E5320 and PR-383.

Crosslinking System

In the compositions of the invention, use may be made of any type of crosslinking system known to those skilled in the art for rubber compositions.

Preferably, the crosslinking system is a vulcanization system, i.e. a system based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the non-productive first phase and/or during the productive phase, as described subsequently.

The sulfur is used in a preferential content within a range extending from 0.3 to 10 phr, more preferentially from 0.3 to 5 phr, in particular from 0.3 to 3 phr.

The vulcanization system of the compositions of the invention may also comprise one or more additional accelerators, for example compounds of the thiuram, zinc dithiocarbamate, sulfenamide, guanidine or thiophosphate family. Use may be made in particular of any compound that is capable of acting as accelerator of the vulcanization of diene elastomers in the presence of sulfur, notably accelerators of the thiazole type and derivatives thereof, and accelerators of thiuram or zinc dithiocarbamate type. These accelerators are more preferentially chosen from the group consisting of 2-mercaptobenzothiazyl disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazole-sulfenamide (abbreviated to "TBBS"), N-(tert-butyl)-2-benzothiazolesulfenimide (abbreviated to "TBSI"), zinc dibenzyldithiocarbamate (abbreviated to "ZBEC"), tetrabenzylthiuram disulfide (TBzTD), and mixtures of these compounds. Preferably, use is made of a primary accelerator of the sulfenamide type.

Other Possible Additives

The rubber compositions according to the invention as described previously make it possible, by themselves alone, to address the posed technical problem; in particular, they make it possible to have excellent rolling resistance properties without penalizing the wet grip. However, they may optionally also include all or some of the customary additives usually used in elastomer compositions intended notably for the manufacture of semi-finished products for tyres or of rubber articles, for instance pigments, protective agents such as antiozone waxes, chemical antiozonants, antioxidants, plasticizers other than those described previously, anti-fatigue agents, reinforcing resins, methylene acceptors (for example novolac phenolic resin) or methylene donors (for example HMT or H3M).

The composition according to the invention may also include a plasticizing system. This plasticizing system may be composed of a hydrocarbon-based resin with a Tg of greater than 20° C. other than a DCDP resin, in addition to the specific hydrocarbon-based resin described previously, and/or a plasticizing oil.

Needless to say, the compositions in accordance with the invention may be used alone or as a blend (i.e., as a mixture) with any other rubber composition that may be used for the manufacture of rubber articles, notably of semi-finished articles for tyres, or of tyres.

It goes without saying that the invention relates to the rubber compositions described previously both in the "raw" or non-crosslinked state (i.e., before curing) and in the "cured" or crosslinked, or also vulcanized, state (i.e., after crosslinking or vulcanization).

2.2—Preparation of the Rubber Compositions

The rubber compositions in accordance with the invention are manufactured in suitable mixers, using two successive preparation phases that are well known to those skilled in the art: a first phase of thermomechanical working or kneading (sometimes termed the "non-productive" phase) at high temperature, up to a maximum temperature of between 110° C. and 200° C., preferably between 130° C. and 180° C., followed by a second phase of mechanical working (sometimes termed the "productive" phase) at a lower temperature, typically of less than 110° C., for example between 60° C. and 100° C., during which finishing phase the crosslinking or vulcanization system is incorporated. Such phases have been described, for example, in patent applications EP-A-0501227, EP-A-0735088, EP-A-0810258, WO00/05300 or WO00/05301.

The first (non-productive) phase is preferentially performed in several thermomechanical steps. During a first step, the elastomers, the reinforcing fillers, notably the reinforcing inorganic filler, the organofunctional silane coupling agent as described above, the specific hydrocarbon-based resin as described above (and optionally the other ingredients with the exception of the crosslinking system) are introduced into a suitable mixer, such as a customary internal mixer, at a temperature between 20° C. and 100° C. and preferably between 25° C. and 100° C. After a few minutes, preferentially from 0.5 to 2 min, and a rise in the temperature to 90° C. or to 100° C., the other ingredients (i.e. those which remain, if not all were put in at the start) are added all at once or in portions, with the exception of the crosslinking system, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling of the mixture thus obtained, the crosslinking system is then incorporated at low temperature (typically less than 100° C.), generally in an external mixer, such as an open mill; the whole is then mixed (productive phase) for a few minutes, for example between 5 and 15 min.

The final composition thus obtained is subsequently calendered, for example in the form of a sheet or of a plaque, notably for laboratory characterization, or else extruded, in order to form, for example, a rubber profile used in the manufacture of semi-finished products for tyres. These products may then be used for the manufacture of tyres, according to techniques known to those skilled in the art.

The crosslinking (or curing) is performed in a known manner at a temperature generally of between 130° C. and 200° C., under pressure, for a sufficient time which may range, for example, between 5 and 90 min, as a function notably of the curing temperature, of the vulcanization system adopted, of the kinetics of crosslinking of the composition under consideration or else of the size of the tyre.

2.3—Semi-Finished Products for a Tyre and Tyre

Another subject of the present invention relates to a semi-finished article for a tyre, comprising at least one rubber composition in accordance with the invention and as defined above. The semi-finished articles of the present invention have improved rolling resistance properties without the wet grip being penalized. Advantageously, they also have improved grip on snow-covered ground.

The semi-finished article may be any article of use for the manufacture of a finished rubber article such as a tyre.

Preferentially, the semi-finished article for a tyre may be chosen from underlayers, bonding rubbers between rubbers of different natures or calendering rubbers for metal or textile reinforcers, sidewall rubbers and treads. More preferentially, the semi-finished article for a tyre is a tread. The semi-finished articles are obtained via methods that are well known to those skilled in the art.

Another subject of the present invention relates to a tyre comprising at least one rubber composition in accordance with the invention and as described above or comprising at least one semi-finished article for a tyre as described above. The tyres of the present invention have improved rolling resistance properties without the wet grip being penalized. Advantageously, they also have grip on snow-covered ground. The tyres of the invention may notably be intended to equip motor vehicles of the passenger vehicle, SUV ("Sports Utility Vehicles"), two-wheel vehicle (notably motorcycle) or aircraft type, such as industrial vehicles chosen from vans, heavy-duty vehicles, i.e. underground trains, buses, heavy road transport vehicles (lorries, tractors, trailers) or off-road vehicles such as heavy agricultural or construction plant vehicles, and other transportation or handling vehicles. The tyres of the invention are obtained via methods that are well known to those skilled in the art.

3—EXAMPLES

The examples that follow illustrate the invention without, however, limiting it.

3.1—Manufacture of the Rubber Compositions:

For the following tests, the compositions are prepared in the following way: the diene elastomers, the reinforcing inorganic filler (silica), the carbon black, the coupling agent to be tested and then, after kneading for one to two minutes, the various other ingredients, including the resin to be tested, with the exception of the vulcanization system, are introduced into an internal mixer which is 70% filled and which has an initial vessel temperature of about 50° C. Thermomechanical working (non-productive phase) is then performed in one step (total kneading time equal to about 5 min), until a maximum "dropping" temperature of about 165° C. is reached.

The mixture thus obtained is recovered and cooled and the vulcanization system (sulfur and accelerator) is then added on an external mixer (homofinisher) at 70° C., the whole being mixed (productive phase) for about 5 to 6 min.

The compositions thus obtained are then calendered, either in the form of plaques (thickness of 2 to 3 mm) or of thin sheets of rubber for measurement of their physical or mechanical properties after curing.

3.2—Test A:

The aim of this test is to demonstrate the improved rolling resistance properties of a rubber composition in accordance with the invention when compared with rubber compositions not in accordance using plasticizing resins other than hydrocarbon-based resins predominantly composed of monomers chosen from the group consisting of cyclopentadiene, dicyclopentadiene, methylcyclopentadiene, and mixtures of these monomers, and using a coupling agent other than the organofunctional silane comprising an oligomer of formula (I).

In the rest of the description, for the sake of simplicity, the hydrocarbon-based resins predominantly composed of monomers chosen from the group consisting of cyclopentadiene, dicyclopentadiene, methylcyclopentadiene, and mixtures of these monomers, will be referred to as DCDP resins. The organofunctional silane coupling agent comprising an oligomer of formula (I) will be called the mercapto/blocked mercapto organofunctional silane coupling agent.

Eight rubber compositions based on diene elastomer reinforced with silica are compared, these compositions differing from each other essentially in the characteristics that follow:

composition CP1 is a non-conforming rubber composition comprising a resin based on α-methylstyrene and/or styrene and a polysulfide silane coupling agent, composition CP2 is a non-conforming rubber composition comprising a resin based on α-methylstyrene and/or styrene and the mercapto/blocked mercapto organofunctional silane coupling agent, composition CP3 is a non-conforming rubber composition comprising a resin based on terpenes (β-pinene) and a polysulfide silane coupling agent, composition CP4 is a non-conforming rubber composition comprising a resin based on terpenes (β-pinene) and the mercapto/blocked mercapto organofunctional silane coupling agent, composition CP5 is a non-conforming rubber composition comprising an aromatic resin based on coumarone-indene and a polysulfide silane coupling agent, composition CP6 is a non-conforming rubber composition comprising a resin based on coumarone-indene and the mercapto/blocked mercapto organofunctional silane coupling agent, composition CP7 is a non-conforming rubber composition comprising a DCPD resin and a polysulfide silane coupling agent, composition CP8 is a conforming rubber composition comprising a DCPD resin and the mercapto/blocked mercapto organofunctional silane coupling agent.

Table I presents the formulations of the rubber compositions CP1 to CP8. The content of the various ingredients is expressed in phr.

TABLE I

|  | CP1 | CP2 | CP3 | CP4 | CP5 | CP6 | CP7 | CP8 |
|---|---|---|---|---|---|---|---|---|
| Elastomer (1) | 100 | 100 | 100 | 100 | 100 | 100 | 100 | 100 |
| Reinforcing inorganic filler (2) | 130 | 130 | 130 | 130 | 130 | 130 | 130 | 130 |
| Coupling agent (3) | 11 | (—) | 11 | (—) | 11 | (—) | 11 | (—) |
| Coupling agent (4) | (—) | 11 | (—) | 11 | (—) | 11 | (—) | 11 |
| Resin 1 (5) | 88 | 88 | (—) | (—) | (—) | (—) | (—) | (—) |
| Resin 2 (5) | (—) | (—) | 88 | 88 | (—) | (—) | (—) | (—) |
| Resin 3 (5) | (—) | (—) | (—) | (—) | 88 | 88 | (-) | (-) |
| Resin 4 (5) | (—) | (—) | (—) | (—) | (—) | (—) | 88 | 88 |
| Carbon black (6) | 4 | 4 | 4 | 4 | 4 | 4 | 4 | 4 |
| Antioxidant (7) | 6 | 6 | 6 | 6 | 6 | 6 | 6 | 6 |
| Anti-ozone wax | 2.85 | 2.85 | 2.85 | 2.85 | 2.85 | 2.85 | 2.85 | 2.85 |
| DPG (8) | 2.4 | 2.4 | 2.4 | 2.4 | 2.4 | 2.4 | 2.4 | 2.4 |
| Stearic acid (9) | 3 | 3 | 3 | 3 | 3 | 3 | 3 | 3 |
| ZnO (10) | 0.9 | 0.9 | 0.9 | 0.9 | 0.9 | 0.9 | 0.9 | 0.9 |
| Accelerator (11) | 2.3 | 2.3 | 2.3 | 2.3 | 2.3 | 2.3 | 2.3 | 2.3 |
| Soluble sulfur | 0.7 | 0.7 | 0.7 | 0.7 | 0.7 | 0.7 | 0.7 | 0.7 |

(1) Styrene-butadiene copolymer, aminoalkoxysilane-functional in the middle of the chain, with a glass transition temperature equal to −88° C., the microstructure of this copolymer is determined via the NIR method. The content of 1,2- units is 12.7% relative to the butadiene units. The mass content of styrene is 2.1%; this copolymer is synthesized according to the process described in WO 2017/060395;
(2) Zeosil 1165 MP silica from the company Solvay, of HDS type; its BET specific surface area is 160 m$^2$/g;
(3) bis(triethoxysilylpropyl)tetrasulfide polysulfide silane coupling agent sold under the reference Si69 from the company Evonik-Degussa;
(4) Mercapto/blocked mercapto organofunctional silane coupling agent sold under the reference NXT-Z45 by Momentive Inc.;
(5) Resins 1 to 4: see table II below;
(6) ASTM N234 grade carbon black sold by Cabot;
(7) N-(1,3-Dimethylbutyl)-N'-phenyl-p-phenylenediamine (Santoflex 6-PPD) from the company Flexsys and 2,2,4-trimethyl-1,2-dihydroquinoline (TMQ);
(8) Diphenylguanidine, Perkacit DPG from the company Flexsys;
(9) Pristerene 4931 stearin from the company Uniqema;
(10) Zinc oxide, industrial grade - from Umicore;
(11) N-Cyclohexyl-2-benzothiazolesulfenamide (Santocure CBS from the company Flexsys).

The resins used in compositions CP1 to CP8 are presented in Table 2 below.

TABLE II

| Resin | Commercial name | Resin manufacturer | Chemical nature | Softening point (° C.) | Tg (° C.) | Mn g/mol | Mw g/mol | PI | Content of aromatic protons |
|---|---|---|---|---|---|---|---|---|---|
| Resin 1 | Kristalex F85 | Eastman Chemical | α-Methylstyrene and styrene | 83 | 37 | 656 | 1147 | 1.75 | 52 |

TABLE II-continued

| Resin | Commercial name | Resin manufacturer | Chemical nature | Softening point (° C.) | Tg (° C.) | Mn g/mol | Mw g/mol | PI | Content of aromatic protons |
|---|---|---|---|---|---|---|---|---|---|
| Resin 2 | Piccolyte S135 | Pinova | Terpenes (β-pinene) | 135 | 87 | 1245 | 2368 | 1.9 | 4 |
| Resin 3 | Neopolymer L-90 | Nisseki | Coumarone-indene aromatic | 98 | 48 | 735 | 1164 | 1.72 | 38 |
| Resin 4 | PR-383 | ExxonMobil | DCDP | 100 | 51 | 490 | 805 | 1.65 | 10 |

The resins were analysed via the methods described in paragraph 1 "Measuring methods used".

Table III gives the properties after curing, about 40 min at 150° C. of compositions CP1 to CP8.

TABLE III

|  | CP1 | CP2 | CP3 | CP4 | CP5 | CP6 | CP7 | CP8 |
|---|---|---|---|---|---|---|---|---|
| Tan (δ)$_{max}$ at 23° C. (base 100) | 100 | 95 | 122 | 116 | 110 | 119 | 79 | 68 |
| Tan (δ)$_{-20°\ C.}$ (base 100) | 100 | 90 | 58 | 53 | 92 | 72 | 149 | 140 |
| G*$_{-20°\ C.}$ (in base 100) | 100 | 105 | 171 | 185 | 122 | 137 | 74 | 69 |

Examination of table III shows that, among all the compositions comprising a polysulfide silane coupling agent (compositions CP3 and CP5 not in accordance with the invention), only composition CP7 not in accordance with the invention and comprising the resin DCPD makes it possible to improve the rolling resistance and also the wet grip and the grip on snow-covered ground, relative to the control composition CP1.

It is also observed that, among all the compositions comprising a mercapto/blocked mercapto organofunctional silane coupling agent (compositions CP2, CP4 and CP6 not in accordance), only composition CP8 in accordance with the invention and comprising the resin DCPD makes it possible to improve the rolling resistance and also the wet grip and the grip on snow-covered ground, relative to the control composition CP1.

Furthermore, surprisingly, it is found that composition CP8 in accordance with the invention combining the presence of the mercapto/blocked mercapto organofunctional silane coupling agent and the DCPD resin shows an improvement in the rolling resistance performance (improvement of −32) and in the grip on snow-covered ground (improvement of −31) which is greater than the addition of the effects of the rolling resistance and of the grip effect on snow-covered ground of composition CP2 relative to composition CP1 (rolling resistance: −5 and grip on snow-covered ground: +5) and that of composition CP7 relative to CP1 (rolling resistance: −21 and grip on snow-covered ground: −26). True synergism is thus seen on the effect of the choice of the mercapto/blocked mercapto organofunctional silane coupling agent and of the resin DCDP within the same composition for the two abovementioned properties.

It is furthermore also noted, surprisingly, that composition CP8 in accordance with the invention has improved rolling resistance properties and grip properties on snow-covered ground with respect to all of the compositions and in particular with respect to composition CP7 not in accordance with the invention without the wet grip being penalized. Specifically, it is found that composition CP8 in accordance with the invention has improved wet grip performance relative to the other non-conforming compositions, and also relative to the control composition CP1.

The invention claimed is:
1. A rubber composition based on at least:
a diene elastomer;
a reinforcing inorganic filler;
an agent for coupling the reinforcing inorganic filler with the diene elastomer, the coupling agent being an organofunctional silane comprising at least one oligomer bearing at least one blocked mercaptosilane unit and at least one mercaptosilane unit, the at least one oligomer corresponding to general formula (I) below:

$$(A)_p(B)_q \qquad (I)$$

in which
A is a blocked mercaptosilane unit corresponding to general formula (II)

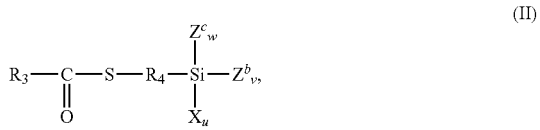

(II)

$$R_3-\underset{\underset{O}{\parallel}}{C}-S-R_4-\underset{\underset{X_u}{|}}{\overset{\overset{Z^c_w}{|}}{Si}}-Z^b_v,$$

B is a mercaptosilane unit corresponding to general formula (III)

(III)

$$HS-R_4-\underset{\underset{X_u}{|}}{\overset{\overset{Z^c_w}{|}}{Si}}-Z^b_v,$$

in which formulae (II) and (III):
R$_3$ is selected from the group consisting of a hydrogen atom, a linear or branched C1-C18 alkyl and a linear or branched C2-C18 alkenyl,
each R$_4$, which may be identical or different, is a saturated, linear or branched C1-C6 divalent hydrocarbon-based group,
Z$^b$ forms a bridging structure between a silicon atom of one unit and a silicon atom of another unit, these units being identical or different, and is selected from the group consisting of (—O—)$_{0.5}$ and [—O(R$^o$CR$^o$)$_f$O—]$_{0.5}$ with R$^o$, which may be identical or different, being a group selected from the group consisting of a hydrogen atom, methyl, ethyl and propyl and f being a number within a range extending from 2 to 15, each $Z^c$, which may be identical or different, forms a cyclic structure with the silicon atom of one unit and is $[-O(R^0CR^0)_fO-]_{0.5}$ with $R^0$ and f as defined above, each X, which may be identical or different, is selected from the group consisting of a hydrogen atom, a hydroxyl group, a C1-C6 alkyl group, a C1-C6 alkoxy group and a group)HO$(R^0CR^0)_fO-$ with $R^0$ and f as defined above, and with u+v+2w=3 in which u is a number equal to 0, 1, 2 or 3, v is a number equal to 1, 2 or 3 and w is a number equal to 0 or 1, p is a number within a range extending from 1 to 20, and q is a number within a range extending from 1 to 20;

a hydrocarbon-based resin predominantly composed of monomers selected from the group consisting of cyclopentadiene, dicyclopentadiene, methylcyclopentadiene and mixtures thereof; and a crosslinking system.

2. The rubber composition according to claim 1, wherein $R_3$ is selected from the group consisting of a hydrogen atom, a linear or branched C1-C10 alkyl and a linear or branched C2-C10 alkenyl.

3. The rubber composition according to claim 1, wherein $R_4$ of formulae (II) and (III), which may be identical or different, is a divalent hydrocarbon-based group selected from the group consisting of methylene, ethylene, propylene and butylene.

4. The rubber composition according to claim 1, wherein $Z^b$ is selected from the group consisting of $(-O-)_{0.5}$, $[-OCH_2CH_2CH_2O-]_{0.5}$, $[-OCH_2CH_2CH_2CH_2O-]_{0.5}$ and $[-OCH_2CH(CH_3)CH_2O-]_{0.5}$.

5. The rubber composition according to claim 4, wherein $Z^b$ is selected from the group consisting of $(-O-)_{0.5}$ or $[-OCH_2CH(CH_3)CH_2O-]_{0.5}$.

6. The rubber composition according to claim 1, wherein $Z^c$ is selected from the group consisting of $[-OCH_2CH_2CH_2O-]_{0.5}$, $[-OCH_2CH_2CH_2CH_2O-]_{0.5}$ and $[-OCH_2CH(CH_3)CH_2O-]_{0.5}$.

7. The rubber composition according to claim 1, wherein X is selected from the group consisting of hydroxyl, methoxy, ethoxy, methyl, ethyl, 3-hydroxypropoxy, 3-hydroxy-2-methylpropoxy and 4-hydroxybut-1-oxy.

8. The rubber composition according to claim 1, wherein the organofunctional silane coupling agent is able to be obtained via a synthetic process comprising a transesterification reaction of a diol compound of general formula (IV):

$$OH(R^0CR^0)_fOH \quad (IV)$$

in which $R^0$, which may be identical or different, is a group selected from a hydrogen atom, methyl, ethyl and propyl, and f is a number ranging from 2 to 15, with at least one blocked mercaptosilane compound of general formula (V):

$$(RO)_3SiR_4SC(=O)R_3 \quad (V)$$

in which R, which may be identical or different, is a linear C1-C6 alkyl group, $R_3$ is a group selected from the group consisting of a hydrogen atom, a linear or branched C1-C18 alkyl and a linear or branched C2-C18 alkenyl, and $R_4$ is a saturated, linear or branched C1-C6 divalent hydrocarbon-based group and with at least one mercaptosilane compound of general formula (VI):

$$(RO)_3SiR_4SH \quad (VI)$$

in which R is a linear C1-C6 alkyl group and $R_4$ is a saturated, linear or branched C1-C6 divalent hydrocarbon-based group.

9. The rubber composition according to claim 1, wherein the hydrocarbon-based resin has a number-average molecular mass Mn that is within a range extending from 200 to 2000 g/mol.

10. The rubber composition according to claim 1, wherein the hydrocarbon-based resin has a glass transition temperature of greater than or equal to 30° C.

11. The rubber composition according to claim 1, wherein a content of the hydrocarbon-based resin is within a range extending from 15 to 150 phr.

12. The rubber composition according to claim 1, wherein a content of reinforcing inorganic filler is within a range extending from 5 to 200 phr.

13. The rubber composition according to claim 1, wherein the reinforcing inorganic filler comprises at least one silica.

14. The rubber composition according to claim 1 further comprising carbon black.

15. The rubber composition according to claim 1, wherein the diene elastomer is selected from the group consisting of polybutadienes, natural rubber, synthetic polyisoprenes, butadiene copolymers, isoprene copolymers, and mixtures thereof.

16. The rubber composition according to claim 15, wherein the diene elastomer is selected from the group consisting of polybutadienes, butadiene-styrene copolymers, isoprene-butadiene copolymers, isoprene-styrene copolymers, isoprene-butadiene-styrene copolymers, and mixtures thereof.

17. The rubber composition according to claim 1, wherein the diene elastomer is a functionalized elastomer.

18. The rubber composition according to claim 17, wherein the functionalized elastomer has a glass transition temperature Tg of less than or equal to −40° C.

19. A semi-finished article for a tire comprising at least one rubber composition according to claim 1.

20. A tire comprising at least one rubber composition according to claim 1.

* * * * *